Patented Dec. 29, 1925.

1,567,632

UNITED STATES PATENT OFFICE.

CHARLES G. WHINFREY, OF SHAKER HEIGHTS VILLAGE, OHIO.

COMPOSITION OF MATTER FOR SELECTIVE CASE HARDENING.

No Drawing. Application filed August 23, 1922. Serial No. 583,928.

*To all whom it may concern:*

Be it known that I, CHARLES G. WHINFREY, a citizen of the United States, and a resident of Shaker Heights Village, county of Cuyahoga, and State of Ohio, have invented a new and useful Improvement in Compositions of Matter for Selective Case Hardening, of which the following is a specification, the principle of the invention being herein explained and the best mode in which I have contemplated applying that principle, so as to distinguish it from other inventions.

The general purposes of selective case-carburizing are excellently set forth and the various known methods of producing local cases are quite fully reviewed in an article entitled "Selective case carburizing" appearing in Chem. and Met. Eng., vol. 26, No. 23, p. 1077. As more fully set forth in the article in question, such purposes briefly are (1) to prevent carbonization of selected areas during case-hardening; (2) to prevent decarbonization of steel during general heat treatment; and (3) to act as an insulating coating to allow coated areas to quench slowly and to remain soft, while uncoated areas are hardened by quick quenching. The methods most generally employed fall into two classes, viz, (*a*) that in which a metallic coating is applied to the part being treated, and (*b*) that in which a non-metallic coating is thus applied. The present improved composition is such a non-metallic coating, designed for use in the connection stated, and has as its object the provision of a carbon resistant paint that while possessing the necessary impermeability to carbonizing gases, may nevertheless be easily removed after its function is performed, and will also have heat insulating properties of value in the aforesaid quenching operation.

To the accomplishment of the foregoing and related ends, the invention, then, consists of the ingredients hereinafter fully described and particularly pointed out in the claims, the following description setting forth in detail one approved combination of ingredients embodying my invention, such disclosed means constituting, however, but one of various forms in which the principle of the invention may be used.

The principal ingredients of my improved composition for selective case-hardening are fire clay, sodium silicate and caustic soda, the first two being the predominant ingredients and the last the minor ingredient in the composition. The caustic soda is employed merely as a modifying agent for the sodium silicate, decreasing the ratio of $SiO_2$ to $Na_2O$ and thus thinning the liquid silicate. In other words, the caustic soda is not used in sufficient quantity to serve as a flux. In addition to the foregoing I find it desirable to include kaolin in an amount intermediate between the amounts of sodium silicate and caustic soda just prescribed and a relatively small quantity of borax. A typical formula which has been found very satisfactory in actual practice is as follows, the proportions being by weight, viz:—

|  | Parts. |
|---|---|
| Fire clay | 60 |
| Sodium silicate | 75 |
| Caustic soda | 3 to 12 |
| Kaolin | 26 |
| Borax | 1 |

The function of the caustic soda, as stated above, is to modify the sodium silicate so that while it still retains its gas impermeability, it is more readily removable after use. It also enables the paint to flow smoothly on a slightly oily surface (in this respect acting as a grease and oil remover) or on a surface coated with oxide. As an alternative to such caustic soda I may employ caustic potash in same amount, or alcohol (either wood or grain alcohol), 6 to 30 parts, or ammonia solution of commercial strength in the same amount.

In preparing my improved composition, the sodium silicate and caustic soda are first mixed with water to make a solution that will flow readily; then the fire clay is added to the resultant solution, or where kaolin and borax are added, they are mixed with the fire clay before thus adding to the solution. The fire clay and kaolin should both be very finely ground or powdered. If caustic potash, alcohol or ammonia is used in place of the caustic soda it should be added to the silicate first and not along with the fire clay as in the case of the borax.

I am aware that mixtures of sodium silicate and some inert filler in various proportions have been employed for the purpose in hand, but all of these have given trouble, in that the resultant coating has been very adherent and difficult to remove even where it performed its intended function as a carbon resistant material.

In contradistinction to such known mixtures, my present improved composition while retaining the essential properties of gas impermeability and drying of sodium silicate, nevertheless give the composition such properties as will permit its ready removal afterwards. Another important property of the present improved composition is that it will adhere to the steel as it comes from the machines without requiring excessive cleaning of the parts; in other words, the fact that the surface of the parts may be greasy, due to the use of oil or the like in the process of machining such parts, will not detrimentally affect the action of the composition. Still another advantage which I obtain is the lowering of the melting point of the mixture whereby a fused mass thereof may be obtained at a temperature that does not involve imparting any detrimental hardening or other effect in the steel.

Other modes of applying the principle of my invention may be employed instead of the one explained, change being made as regards the materials employed provided the ingredients stated by any of the following claims or the equivalent of such stated ingredients be employed.

I therefore particularly point out and distinctly claim as my invention:—

1. An improved composition of matter for use in selective case-hardening, including fire clay, sodium silicate and caustic soda.

2. An improved composition of matter for use in selective case-hardening, including fire clay, sodium silicate and caustic soda, such fire clay and sodium silicate being the predominant ingredients and such caustic soda the minor ingredient.

3. An improved composition of matter for use in selective case-hardening, including fire-clay, sodium silicate, and an ingredient capable of removing grease and oil from the article treated.

4. An improved composition of matter for use in selective case-hardening, including fire-clay, sodium silicate, and a thinner for the latter capable of removing grease and oil from the article treated.

5. An improved composition of matter for use in selective case-hardening, including fire-clay, sodium silicate, a thinner for the latter, and kaolin.

6. An improved composition of matter for use in selective case-hardening, including fire-clay, sodium silicate, a thinner for the latter, and borax.

7. An improved composition of matter for use in selective case-hardening, including fire-clay, sodium silicate, a thinner for the latter, and kaolin and borax.

8. An improved composition of matter for use in selective case-hardening, including fire clay, sodium silicate and caustic soda, such fire clay and sodium silicate being the predominant ingredients and such caustic soda the minor ingredient, together with kaolin and an ingredient capable of removing grease and oil from the article treated.

9. An improved composition of matter for use in selective case-hardening, including fire clay, sodium silicate and caustic soda, such fire clay and sodium silicate being the predominant ingredients and such caustic soda the minor ingredient, together with kaolin and borax.

10. An improved composition of matter for use in selective case-hardening, including fire clay, sodium silicate and caustic soda, such fire clay and sodium silicate being the predominant ingredients and such caustic soda the minor ingredient, together with kaolin in an amount intermediate between the amounts of sodium silicate and caustic soda and a relatively small amount of borax.

11. An improved composition of matter for use in selective case-hardening, including the following ingredients in approximately the proportions indicated, viz: fire clay, sixty (60) parts; sodium silicate, seventy-five (75) parts; caustic soda, three to twelve (3 to 12) parts; kaolin, twenty-six (26) parts; and borax, one (1) part.

Signed by me this 16th day of August, 1922.

CHARLES G. WHINFREY.